(12) United States Patent
Kwak et al.

(10) Patent No.: US 9,898,114 B2
(45) Date of Patent: Feb. 20, 2018

(54) ELECTROACTIVE PRIVACY LAYER OF A DISPLAY DEVICE

(71) Applicant: Intel Corporation, Santa Clara, CA (US)

(72) Inventors: Dong Yeung Kwak, San Jose, CA (US); Ramon C. Cancel Olmo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 14/581,602

(22) Filed: Dec. 23, 2014

(65) Prior Publication Data

US 2016/0179231 A1  Jun. 23, 2016

(51) Int. Cl.
  *G09G 5/00* (2006.01)
  *G06F 3/041* (2006.01)
  *G02B 1/11* (2015.01)
  *G06F 21/84* (2013.01)

(52) U.S. Cl.
  CPC ............ *G06F 3/041* (2013.01); *G02B 1/11* (2013.01); *G06F 21/84* (2013.01); *G06F 2203/04103* (2013.01)

(58) Field of Classification Search
  CPC ............ G06F 3/0412; G06F 2203/041; G06F 2203/04107; G06F 2203/04111; G06F 3/0421; G06F 2203/04109; G06F 3/0428; G09G 3/025; G09G 3/16; G09G 3/06; G09G 3/18; G09G 3/19; G09G 2300/0486; G09G 2300/0491
  USPC ..................... 345/173–178, 87–89
  See application file for complete search history.

(56) References Cited

U.S. PATENT DOCUMENTS

| 2002/0119384 | A1 | 8/2002 | Koyama et al. | |
| 2010/0309414 | A1* | 12/2010 | Tomonaga | G02B 5/3041 349/96 |
| 2011/0234537 | A1 | 9/2011 | Kim et al. | |
| 2012/0249939 | A1 | 10/2012 | Do et al. | |
| 2013/0300985 | A1* | 11/2013 | Bulda | G02F 1/1323 349/86 |
| 2014/0139493 | A1 | 5/2014 | King et al. | |
| 2014/0232960 | A1* | 8/2014 | Schwartz | G02B 26/004 349/12 |
| 2015/0338700 | A1* | 11/2015 | Kimura | G06F 3/0412 349/12 |

FOREIGN PATENT DOCUMENTS

EP   2746824 A1   6/2014

OTHER PUBLICATIONS

"Private Image Viewer", U.S. Appl. No. 14/566,417, filed Dec. 10, 2014, pp. 1-21.
PCT International Search Report, PCT No. PCT/US2015/054898, dated Feb. 29, 2016, 3 pages.

* cited by examiner

*Primary Examiner* — Jennifer Nguyen
(74) *Attorney, Agent, or Firm* — International IP Law Group, P.L.L.C.

(57) ABSTRACT

Techniques related to privacy at display devices are described herein. The techniques include an apparatus having an electroactive privacy layer of a display device. The electroactive privacy layer is configured to restrict a propagation direction of light emission associated with a display layer of the display device. The restriction of propagation is generated by an electric force applied to the electroactive privacy layer.

25 Claims, 8 Drawing Sheets

ELECTROACTIVE PRIVACY LAYER OF A DISPLAY DEVICE

TECHNICAL FIELD

This disclosure relates generally to privacy display devices. More specifically, the techniques described herein include an electroactive privacy layer of a display device.

BACKGROUND ART

In computer systems, a display device may be used to display various image content. In some cases, a display device may include a touch screen, wherein tactile input can be received at the display device. Detachable privacy screens are sometimes used at display devices to restrict propagation direction of light emitted from the display device. In some cases, the use of privacy screens may inhibit or reduce functionality of a touch screen associated with the display device.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for privacy at a display device. Specifically, a display device may include an electroactive privacy layer. As discussed above, in some cases touch screen may be implemented within a display device. A touch screen may include any component configured to enable interactions via touch, including touch using a stylus, a finger of user, and the like. However, a privacy screen placed over the touch screen may reduce functionality of the touch screen.

The techniques describe herein include an electroactive privacy layer disposed between a display layer and a touch sensitive layer of a display device. The electroactive privacy layer may restrict a direction of light propagating through the electroactive privacy material when an electric force is applied to the electroactive privacy layer. For example, a display device may be configured to emit light propagating through the electroactive privacy layer. In this scenario, when electricity is applied to the electroactive privacy layer the propagation direction of the emitted light is restricted. The restriction of the direction of light propagation may enhance private viewing of the display device while preserving touch screen functionality. Further, initiating the propagation direction restriction may be turned on and off based on various conditions such as user settings, environmental conditions, the type of image content to be displayed, and the like, as discussed in more detail below.

An electroactive privacy layer, as referred to herein, is a material that is electrically responsive. The electroactive privacy layer may be composed of an electrically anisotropic material. In some cases, the electroactive privacy layer may be composed of an optically and electrically anisotropic birefringence dielectric polymer. The electroactive privacy layer exhibits propagation direction restriction when stimulated by an electric field.

Figure 1:
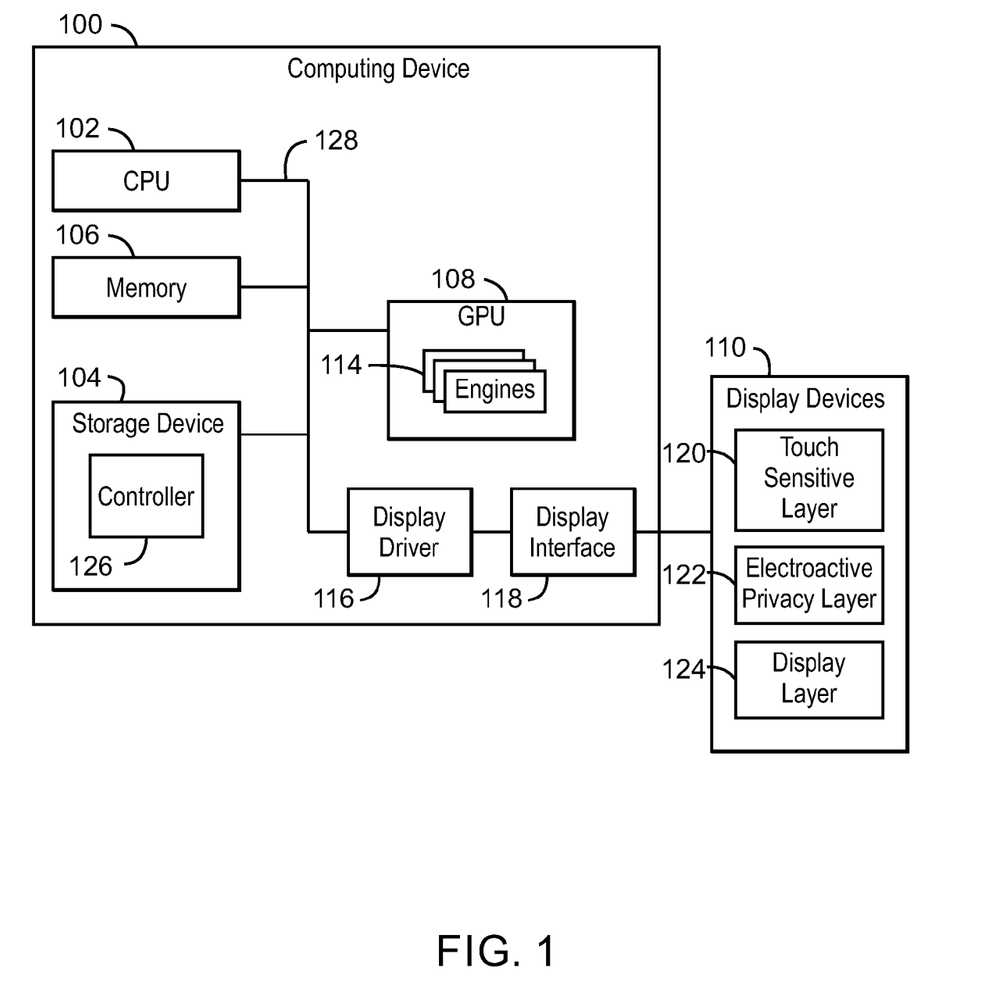
FIG. 1 is a block diagram illustrating a computing device configured to initiate a restriction in light propagation associated with a display device.

FIG. 1 is a block diagram illustrating a computing device configured to initiate a restriction in light propagation associated with a display device. The computing device 100 may be, for example, a laptop computer, desktop computer, ultrabook, tablet computer, mobile device, or server, among others. The computing device 100 may include a processing device 102 that is configured to execute stored instructions, as well as a storage device 104 including a non-transitory computer-readable medium, and a memory device 106.

The computing device 100 may also include a graphics processing unit (GPU) 108. In some cases, the GPU 108 is embedded in the processing device 102. In other cases, the GPU 108 may be a discrete component relative to the CPU 102. The GPU 108 may include a cache, and can be configured to perform any number of graphics operations within the computing device 100. For example, the GPU 108 may be configured to render or manipulate graphics images, graphics frames, videos, or the like, to be displayed to a user of the computing device 100 at a display device 110. Displaying image data may be carried out by one or more engines 114 of the GPU 108, a display driver 116, a display interface 118, and the like.

The display device 110 may be implemented as an external display device to the computing device 100, as an internal display device to the computing device 100, or any combination thereof. In any case, the display device may include a touch sensitive layer 120, an electroactive privacy layer (EPL) 122 and a display layer 124. The touch sensitive layer 120 may be at least a component of a touch screen. The display layer 124 may be a component of a display screen configured to emit light, such as a light emitting diode display, a liquid crystal display, an electronic paper display, and the like.

As discussed above, the EPL 122 may be composed of an electrically anisotropic dielectric material. The EPL 122 may be activated into an "on" as electric current passes through the dielectric material, and may be deactivated into an "off" state as current is reduced or stopped.

In some cases, the EPL 122 may be activated by a controller 126. The controller 126 may be implemented as logic, at least partially comprising hardware logic. In other cases, the controller 126 may be implemented as a portion of software stored in the storage device 104, as software or firmware instructions of the display driver 116, the display interface, the engines 114 of the GPU 108, the processing device 102, any other suitable controller, or any combination thereof. In yet other cases, the controller 126 may be implemented as electronic logic, at least partially comprising hardware logic, to be carried out by electronic circuitry, circuitry to be carried out by an integrated circuit, and the like. The controller 126 may be configured to operate independently, in parallel, distributed, or as a part of a broader process. In yet other cases, the controller 122 may be implemented as a combination of software, firmware, hardware logic, and the like.

As discussed above, the EPL 122 may be activated based on the presence of one or more conditions. The conditions may include stored user settings, content of images to be displayed at the display device, contextual data indicating an environment within which the display is disposed, and the like. For example, some image content may be marked as private and the ELP 122 may be activated when it is to be displayed at the display layer 124. In some cases, certain applications may be associated with image content that is desired to be privately viewed. In this scenario, the EPL 122 may activate during an entire period a given application is open. Further, in some cases, an environment of the display may include many people, and the EPL 122 may be activated to preserve privacy of the images being displayed. Detection of contextual data of the environment may be done by various sensors, such as ambient light sensors, cameras, thermometers, and the like, or any other software or firmware operations capable of detecting contextual data. In yet other cases, a user profile may indicate a preference for when to activate the EPL 122 based on any combination of the conditions described above.

The memory device 106 can include random access memory (RAM), read only memory (ROM), flash memory, or any other suitable memory systems. For example, the memory device 106 may include dynamic random access memory (DRAM). The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems.

The processing device 102 may be a main processor that is adapted to execute the stored instructions. The processing device 102 may be a single core processor, a multi-core processor, a computing cluster, or any number of other configurations. The processing device 102 may be implemented as Complex Instruction Set Computer (CISC) or Reduced Instruction Set Computer (RISC) processors, x86 Instruction set compatible processors, multi-core, or any other microprocessor or central processing unit (CPU). The processing device 102 may be connected through a system bus 128 (e.g., Peripheral Component Interconnect (PCI), Industry Standard Architecture (ISA), PCI-Express, HyperTransport®, NuBus, etc.) to components including the memory 106 and the storage device 104. The processing device 102 may also be linked through the bus 128 to the display driver 116 and the display interface 118 configured to connect the computing device 100 to the display device 110 via the digital display interface 118. The display device 110 may include a computer monitor, television, projector, among others, that are connected to the computing device 100, or integrated within the computing device 100.

In some cases, the computing device 100 may be a mobile computing device. In some cases, the display device 110 may be a mobile display device to a mobile computing device.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
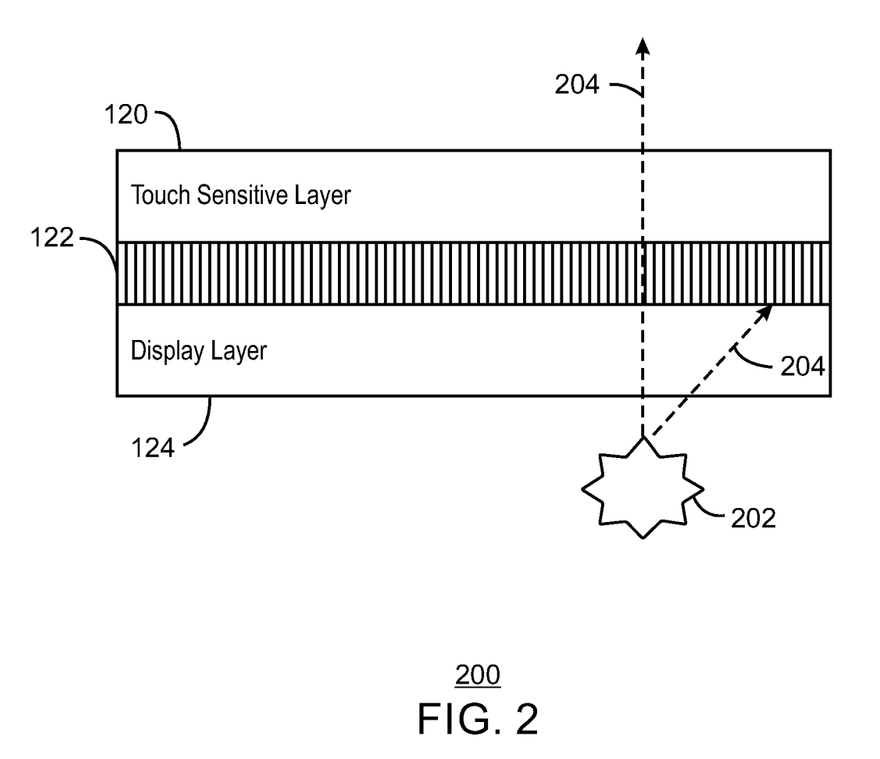
FIG. 2 is diagram illustrating a side view of layers of a display device including an electroactive privacy layer.

FIG. 2 is diagram illustrating a side view of layers of a display device including an electroactive privacy layer. As discussed above, the EPL 122 may be disposed between the touch sensitive layer 120 and the display layer 124 of a display device, such as the display device 110 of FIG. 1. As illustrated in FIG. 2, when the EPL 122 is activated, light emitted from a source 202 may be restricted by the EPL 122. The source 202 may be a backlight component in some cases. In some cases, the source 202 may be a component of the display layer 124. In any case, light propagation 204 may be allowed through the EPL 122 at a given angle relative to the source 202, while light propagation 206 at a different angle is restricted.

Figure 3:
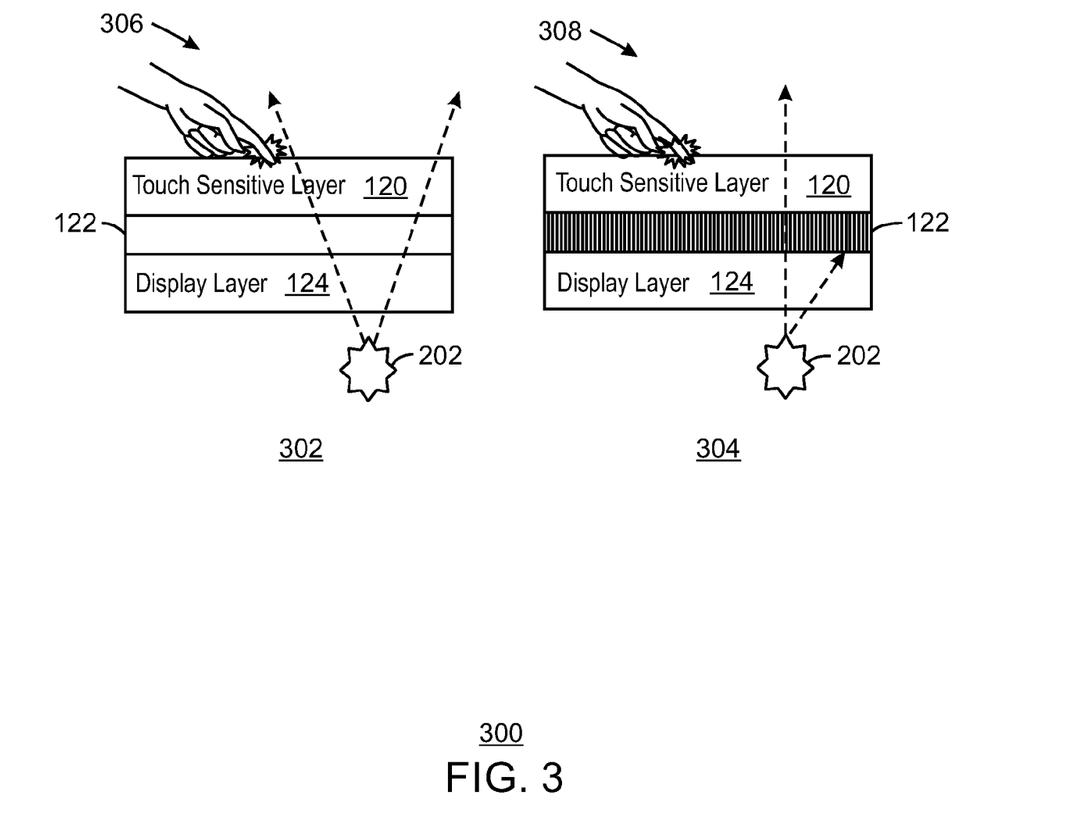
FIG. 3 is a diagram illustrating light propagation during an off state and an on state.

FIG. 3 is a diagram illustrating light propagation during an off state and an on state. As discussed above in regard to FIG. 1, the EPL 122 may be activated and deactivated. In an on state 302, light emitted from the source 202 may propagate in many directions, whereas in an off state 304, light emitted from the source 202 propagates through the EPL 122 in a restricted manner. Further, in either the off state 302 or the on state 304, the touch sensitive layer 120 may provide touch screen functionality as indicated at 306 and 308. Therefore, the techniques described herein enable privacy to be provided at a touch screen display.

Figure 4:
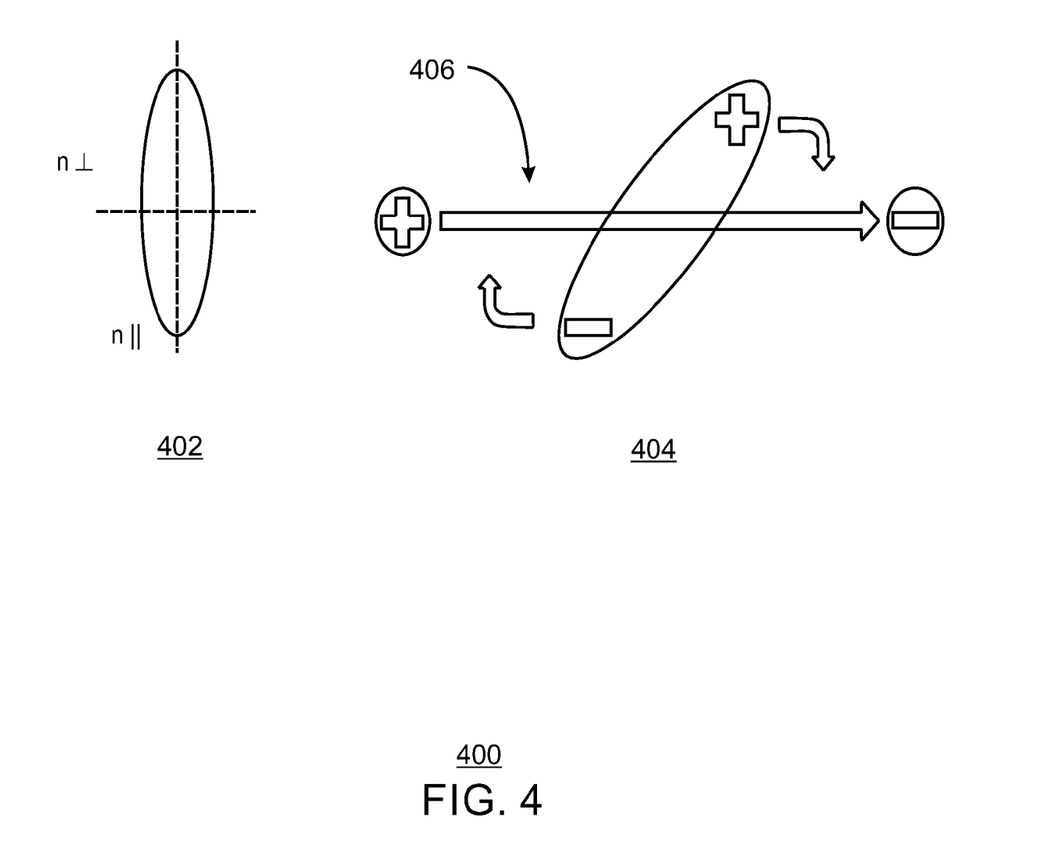
FIG. 4 is a diagram illustrating characteristics of the electroactive privacy layer.

FIG. 4 is a diagram illustrating characteristics of the electroactive privacy layer. At 402, anisotropic birefringence material is illustrated, while at 404 anisotropic response in the ELP 122 is illustrated. A variable "n" is the refractive index of a dielectric material of the ELP 122. A characteristic of the anisotropic birefringence material is that the "n ⊥" is not equal to "n ∥." Therefore, light propagating that is non-parallel to n ∥ axis of 402 may be restricted when the ELP 122 is activated. As an electric field associated with a circuit 406 is reduced, non-parallel light is less restricted, as indicated at 404.

Figure 5:
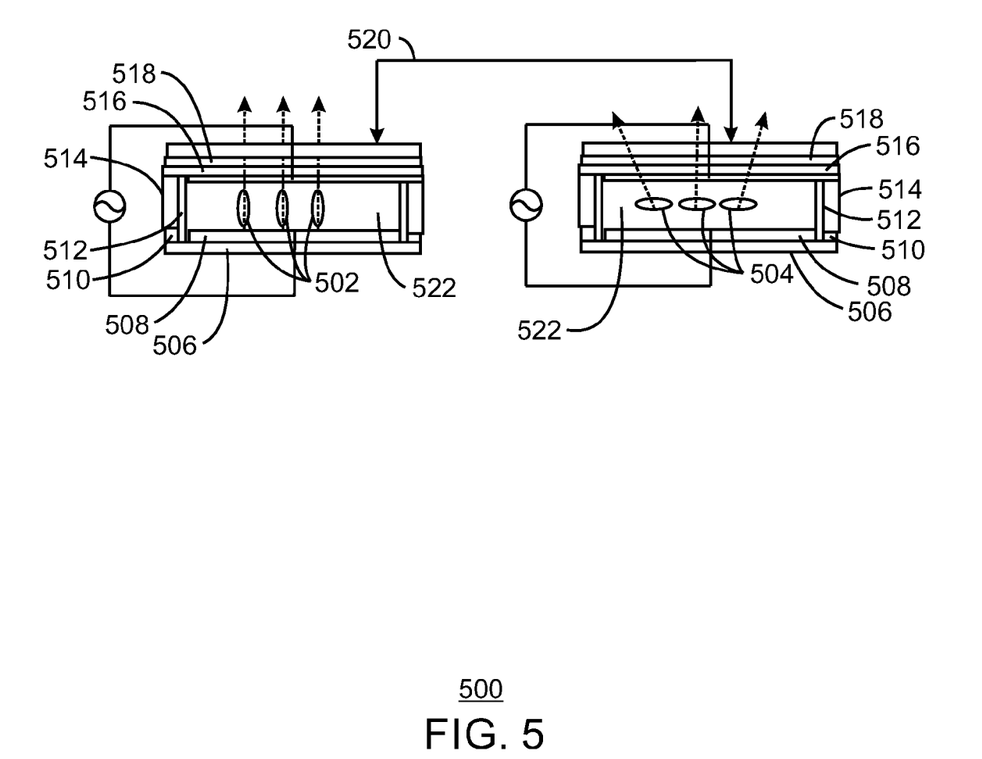
FIG. 5 is a diagram illustrating a side view of components of a display device having an electroactive privacy layer in an off state and an on state.

FIG. 5 is a diagram illustrating a side view of components of a display device having an electroactive privacy layer in an off state and an on state. In an on state, light propagation is restricted to a given direction, as illustrated 502. In an off state, light propagation is less restricted to the given direction, as illustrated at 504.

Additional components of the ELP 122 are illustrated in FIG. 5. The additional components may include a bottom substrate 506, a bottom electrode 508, a voltage input 510, a seal 512, a conductor 514, a top electrode 516, and a top substrate 518.

The top substrate 518 and the bottom substrate 506 may be configured to house an electrically anisotropic dielectric material 522. The substrates 506 and 518 may be composed of a transparent material such as glass, polyethylene terephthalate (PET), and the like. One of the electrodes, including either the bottom electrode 508 or the top electrode 516 of FIG. 5, may be configured as a driving electrode, while the other electrode may be configured as a common electrode. In FIG. 5, the bottom electrode 508 may be the driving electrode and the top electrode 516 may be the common electrode. Voltage input 510 may be coupled to the top electrode 516 through the conductor 514 such that the electrically anisotropic dielectric material 522 may be electrically stimulated in the "on" state. The electrically anisotropic dielectric material 522 of FIG. 5 may be sealed by the seal 512. The conductor 514 may be outside of the sealing. In the "off" state, current will not flow to the top electrode 516. The electrically anisotropic dielectric material 522 may be insulated from conductor 514 by the seal 512.

In some cases, a retardation film 520 may be disposed on top of the top substrate 518. The retardation film 520 may be configured to reduce an optical distortion associated with the restriction of light propagation direction.

Figure 6:
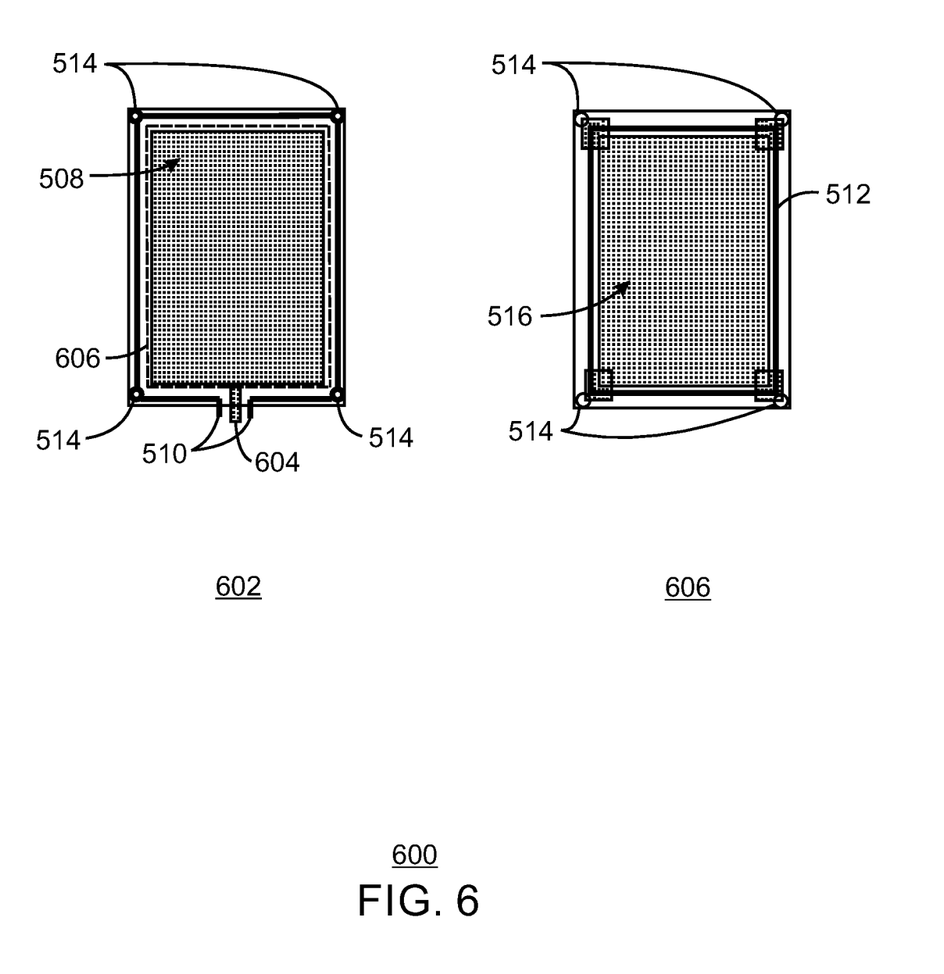
FIG. 6 is a diagram illustrating a top view of components of a display device having an electroactive privacy layer.

FIG. 6 is a diagram illustrating a top view of components of a display device having an electroactive privacy layer. A bottom layer 602 may include components of an EPL, such as the EPL 122 of FIG. 1, as discussed above in regard to FIG. 5. For example, the bottom layer 602 may include the driving voltage input 510 (or On/Off voltage) and a common voltage input that is a reference voltage to driving voltage indicated at 604. The bottom layer 602 also includes the bottom electrode 508 and the conductor 514. As illustrated in FIG. 6, the conductor 514 may be implemented as conductive dots disposed near corners of the bottom layer 602. A seal placement 606 indicated in FIG. 6 illustrates possible placement area for a seal, such as the seal 512 of FIG. 5. Further, a top layer 606 includes the seal 512, and the top electrode 516.

Figure 7:
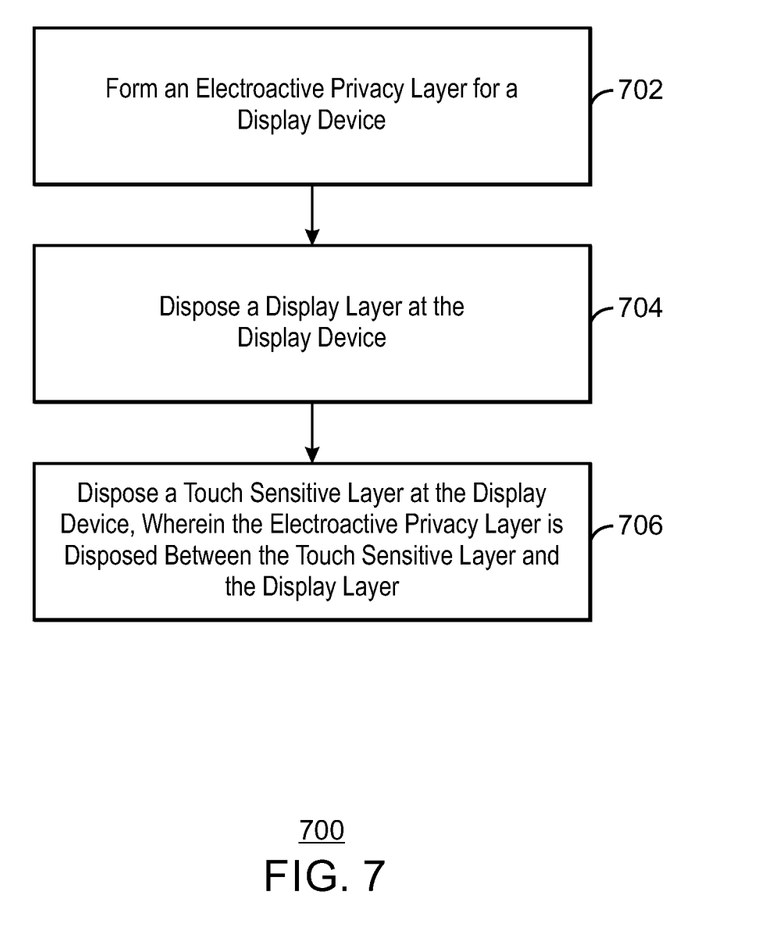
FIG. 7 is a block diagram illustrating a method for forming an electroactive privacy layer of a display device.

FIG. 7 is a block diagram illustrating a method for forming an electroactive privacy layer of a display device. The method 700 may include forming 702 an electroactive privacy layer (EPL) for a display device. The electroactive privacy layer is configured to restrict a propagation direction of light emission associated with a display layer of the display device. In some cases, the light emission may be associated with a backlight associated with the display device. In any case, the restriction of propagation is generated by an electric force applied to the EPL.

In some cases, the method 700 may include disposing the display layer at the display device, as indicated at block 704. Further, the method 700 may include disposing a touch sensitive layer at the display device. In this scenario, the touch sensitive layer is configured to receive tactile input at the display device even when light propagation is restricted.

In some cases, the electroactive privacy layer is an integrated component with the touch layer. This combined touch and privacy layer may be disposed on the display layer.

In some cases, the method 700 may include disposing a retardation film at the display device. The retardation film may be configured to reduce an optical distortion associated with the restriction of light propagation direction.

In some cases, the method 700 further includes disposing the EPL between the display layer and the touch sensitive layer. In this disposition, a touch functionality of the display device may be preserved while allowing for restricted privacy viewing.

In some cases, the method 700 may include coupling a controller to the EPL. The controller may be communicatively coupled such that voltage may be applied to the dielectric of the EPL. The controller may have logic, at least partially including hardware logic, to initiate the restriction of light propagation based on a condition. The condition may include one or more user settings, content of images displayed at the display device, contextual data indicating an environment within which the display device is disposed, and the like.

Figure 8:
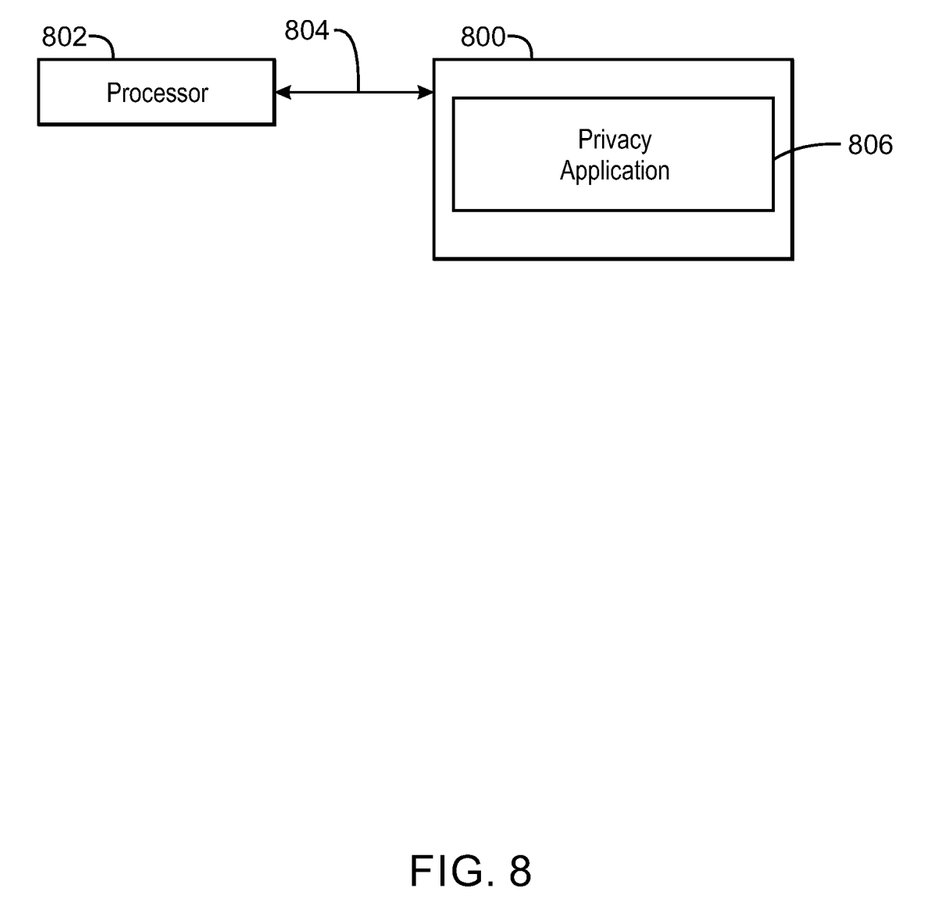
FIG. 8 is a block diagram depicting an example of a computer-readable medium configured to initiate restriction in light propagation associated with a display device.

FIG. 8 is a block diagram depicting an example of a computer-readable medium configured to initiate restriction in light propagation associated with a display device. The computer-readable medium 800 may be accessed by a processor 802 over a computer bus 804. In some examples, the computer-readable medium 800 may be a non-transitory computer-readable medium. In some examples, the computer-readable medium may be a storage medium. However, in any case, the computer-readable medium does not include transitory media such as carrier waves, signals, and the like. Furthermore, the computer-readable medium 800 may include computer-executable instructions to direct the processor 802 to perform the steps of the current method.

The various software components discussed herein may be stored on the tangible, non-transitory, computer-readable medium 800, as indicated in FIG. 8. For example, a privacy application 806 may be configured to initiate the restriction of light propagation based on a condition, including various conditions discussed above.

Examples may include subject matter such as a method, means for performing acts of the method, at least one machine-readable medium including instructions that, when performed by a machine cause the machine to performs acts of the method. It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

Example 1 includes an apparatus. The apparatus may include an electroactive privacy layer of a display device. The electroactive privacy layer is configured to restrict a propagation direction of light emission associated with a display layer of the display device. The restriction of propagation is generated by an electric force applied to the electroactive privacy layer.

Example 1 may include any combination of the cases discussed below. In some cases, the apparatus may also include a display layer of the display device, a touch sensitive layer of the display device, and a voltage source to apply the electric force to the electroactive material. The touch sensitive layer is configured to receive tactile input at the display device even when light propagation is restricted. In some cases, the electroactive privacy layer is disposed between the display layer and the touch sensitive layer. In some cases, the apparatus includes a retardation film configured to reduce an optical distortion associated with the restriction in light propagation. The electroactive privacy layer may include a top electrode, a bottom electrode, and a dielectric disposed between the top electrode and the bottom electrode. The dielectric may be an electrically anisotropic dielectric material.

In some cases, the apparatus further includes a controller having logic, at least partially including hardware logic, to initiate the restriction of light propagation based on a condition. The condition can include one or more user settings, content of images displayed at the display device, contextual data indicating an environment within which the display device is disposed, and the like.

Example 2 includes a method. The method includes forming an electroactive privacy layer for a display device.

The electroactive privacy layer is configured to restrict a propagation direction of light emission associated with a display layer of the display device. The restriction of propagation is generated by an electric force applied to the electroactive privacy layer.

Example 2 may include any combination of the cases discussed below. In some cases, the method may include disposing the display layer at the display device, disposing a touch sensitive layer at the display device, and coupling a voltage source to the electroactive privacy layer. The touch sensitive layer can be configured to receive tactile input at the display device even when light propagation is restricted. The method may also include disposing the electroactive privacy layer between the display layer and the touch sensitive layer. In some cases, the method may include disposing a retardation film at the display device, wherein the retardation film configured to reduce an optical distortion associated with the restriction in light propagation direction. The electroactive privacy layer may include a top electrode, a bottom electrode, and a dielectric disposed between the top electrode and the bottom electrode. The dielectric may be an electrically anisotropic dielectric material.

In some cases, the method may include coupling a controller to electroactive privacy layer, the controller having logic, at least partially including hardware logic, to initiate the restriction of light propagation based on a condition. The condition can include one or more user settings, content of images displayed at the display device, contextual data indicating an environment within which the display device is disposed, and the like.

Example 3 includes a system. The system may include a display layer of a display device, a touch sensitive layer of the display device, wherein the touch sensitive layer is configured to receive tactile input at the display device, and an electroactive privacy layer of the display device. The electroactive privacy layer is configured to restrict a propagation direction of light emission associated with a display layer of the display device. The restriction of propagation is generated by an electric force applied to the electroactive privacy layer.

Example 3 may include any combination of the cases discussed below. In some cases, the touch sensitive layer is configured to receive tactile input at the display device even when light propagation is restricted. The system may further include a retardation film configured to reduce an optical distortion associated with the restriction in light propagation. The electroactive privacy layer may include a top electrode, a bottom electrode, and a dielectric disposed between the top electrode and the bottom electrode. The dielectric may be an electrically anisotropic dielectric material.

In some cases, the system further includes a controller having logic, at least partially including hardware logic, to initiate the restriction of light propagation based on a condition. The condition can include one or more user settings, content of images displayed at the display device, contextual data indicating an environment within which the display device is disposed, and the like.

Example 4 includes an apparatus. The apparatus may include an means for electroactive privacy of a display device. The means for electroactive privacy is configured to restrict a propagation direction of light emission associated with a display layer of the display device. The restriction of propagation is generated by an electric force applied to the means for electroactive privacy.

Example 4 may include any combination of the cases discussed below. In some cases, the apparatus may also include a display layer of the display device, a touch sensitive layer of the display device, and a voltage source to apply the electric force to the electroactive material. The touch sensitive layer is configured to receive tactile input at the display device even when light propagation is restricted. In some cases, the means for electroactive privacy is disposed between the display layer and the touch sensitive layer. In some cases, the apparatus includes a retardation film configured to reduce an optical distortion associated with the restriction in light propagation. The means for electroactive privacy may include a top electrode, a bottom electrode, and a dielectric disposed between the top electrode and the bottom electrode. The dielectric may be an electrically anisotropic dielectric material.

In some cases, the apparatus further includes a controller having logic, at least partially including hardware logic, to initiate the restriction of light propagation based on a condition. The condition can include one or more user settings, content of images displayed at the display device, contextual data indicating an environment within which the display device is disposed, and the like.

Example 5 includes a method. The method includes forming a means for electroactive privacy for a display device. The means for electroactive privacy is configured to restrict a propagation direction of light emission associated with a display layer of the display device. The restriction of propagation is generated by an electric force applied to the means for electroactive privacy.

Example 5 may include any combination of the cases discussed below. In some cases, the method may include disposing the display layer at the display device, disposing a touch sensitive layer at the display device, and coupling a voltage source to the means for electroactive privacy. The touch sensitive layer can be configured to receive tactile input at the display device even when light propagation is restricted. The method may also include disposing the means for electroactive privacy between the display layer and the touch sensitive layer. In some cases, the method may include disposing a retardation film at the display device, wherein the retardation film configured to reduce an optical distortion associated with the restriction in light propagation direction. The means for electroactive privacy may include a top electrode, a bottom electrode, and a dielectric disposed between the top electrode and the bottom electrode. The dielectric may be an electrically anisotropic dielectric material.

In some cases, the method may include coupling a controller to means for electroactive privacy, the controller having logic, at least partially including hardware logic, to initiate the restriction of light propagation based on a condition. The condition can include one or more user settings, content of images displayed at the display device, contextual data indicating an environment within which the display device is disposed, and the like.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
    a display layer;
    a touch sensitive layer; and
    an electroactive privacy layer, wherein:
        the electroactive privacy layer is positioned between the display layer and the touch sensitive layer, and is to restrict a propagation direction of light emitted by the display layer in response to an electric current applied to the electroactive privacy layer and the electroactive privacy layer comprises a retardation film disposed atop a top substrate and a seal to insulate the electroactive privacy layer from a conductor.

2. The apparatus of claim 1, further comprising
    a display layer of the display device;
    a touch sensitive layer of the display device, wherein the touch sensitive layer is configured to receive tactile input at the display device even when light propagation is restricted; and
    a voltage source to apply the electric force to the electroactive material.

3. The apparatus of claim 2, further comprising the retardation film configured to reduce an optical distortion associated with the restriction in light propagation.

4. The apparatus of claim 2, wherein the electroactive privacy layer is disposed between the display layer and the touch sensitive layer.

5. The apparatus of claim 1, wherein the electroactive privacy layer comprises:
    a top electrode;
    a bottom electrode; and
    a dielectric disposed between the top electrode and the bottom electrode.

6. The apparatus of claim 5, wherein the dielectric is composed of an electrically anisotropic dielectric material.

7. The apparatus of claim 1, further comprising a controller having logic, at least partially comprising hardware logic, to initiate the restriction of light propagation based on a condition.

8. The apparatus of claim 7, wherein the condition comprises one or more user settings.

9. The apparatus of claim 7, wherein the condition comprises content of images displayed at the display device.

10. The apparatus of claim 7, wherein the condition comprises contextual data indicating an environment within which the display device is disposed.

11. A method, comprising:
    forming a display layer;
    forming a touch sensitive layer; and
    forming an electroactive privacy layer, wherein:
        the electroactive privacy layer positioned between the display layer and the touch sensitive layer, and is to restrict a propagation direction of light emitted by a display layer in response to an electric current applied to the electroactive privacy layer and the electroactive privacy layer comprises a seal to insulate the electroactive privacy layer from a conductor, wherein the conductor comprises conductive dots disposed near corners of a bottom layer.

12. The method of claim 11, further comprising
    disposing the display layer at the display device;
    disposing a touch sensitive layer at the display device, wherein the touch sensitive layer is configured to receive tactile input at the display device even when light propagation is restricted; and
    coupling a voltage source to the electroactive privacy layer.

13. The method of claim 12, further comprising disposing a retardation film at the display device, wherein the retardation film configured to reduce an optical distortion associated with the restriction in light propagation direction.

14. The method of claim 12, further comprising disposing the electroactive privacy layer between the display layer and the touch sensitive layer.

15. The method of claim 11, wherein the electroactive privacy layer comprises:

a top electrode;

a bottom electrode; and a dielectric disposed between the top electrode and the bottom electrode.

16. The method of claim 15, wherein the dielectric is composed of an electrically anisotropic dielectric material.

17. The method of claim 11, further comprising coupling a controller to electroactive privacy layer, the controller having logic, at least partially comprising hardware logic, to initiate the restriction of light propagation based on a condition.

18. The method of claim 17, wherein the condition comprises one or more user settings.

19. The method of claim 17, wherein the condition comprises content of images displayed at the display device.

20. The method of claim 17, wherein the condition comprises contextual data indicating an environment within which the display device is disposed.

21. A system, comprising:

a display layer;

a touch sensitive layer, wherein the touch sensitive layer is configured to receive tactile input; and an electroactive privacy layer, wherein:

the electroactive privacy layer is positioned between the display layer and the touch sensitive layer, and is to restrict a propagation direction of light emitted by the display layer in response to an electric current applied to the electroactive privacy layer and the electroactive privacy layer comprises a retardation film disposed atop a top substrate and a seal to insulate the electroactive privacy layer from a conductor.

22. The system of claim 21, further comprising a retardation film configured to reduce an optical distortion associated with the restriction in light propagation.

23. The system of claim 21, wherein the electroactive privacy layer is disposed between the display layer and the touch sensitive layer, and wherein the electroactive privacy layer comprises:

a top electrode;

a bottom electrode; and a dielectric disposed between the top electrode and the bottom electrode.

24. The system of claim 23, wherein the dielectric is composed of an optically anisotropic birefringence and electrically anisotropic dielectric material.

25. The system of claim 21, further comprising a controller having logic, at least partially comprising hardware logic, to initiate the restriction of light propagation based on a condition, wherein the condition comprises:

one or more user settings;

content of images displayed at the display device;

contextual data indicating an environment within which the display device is disposed; or any combination thereof.

* * * * *